Feb. 14, 1933.  J. BELLIS  1,897,358
CARBURETOR CONTROL MECHANISM
Filed Oct. 6, 1930
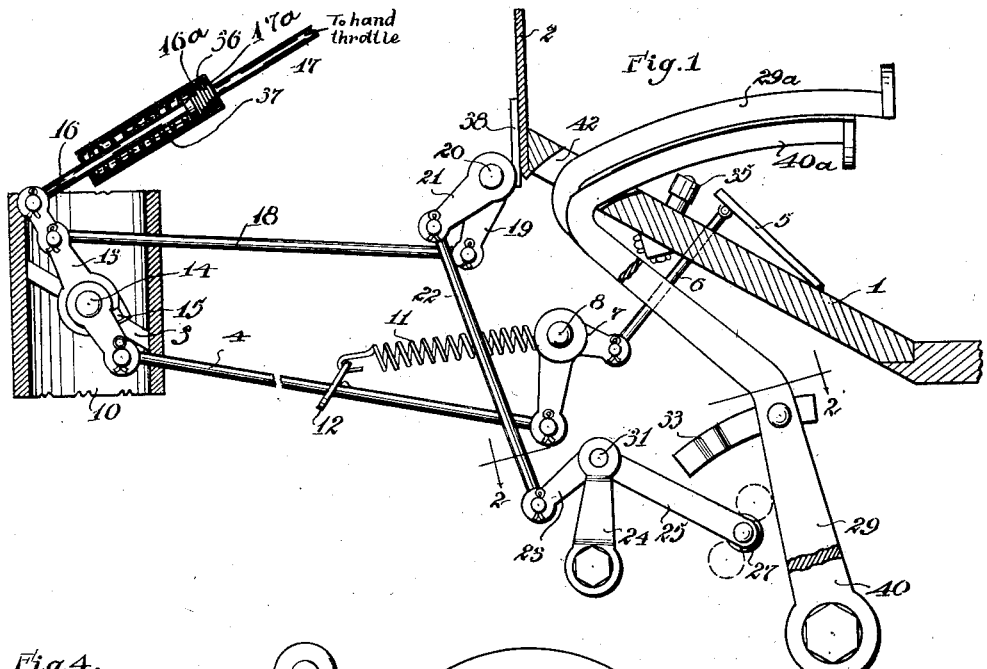
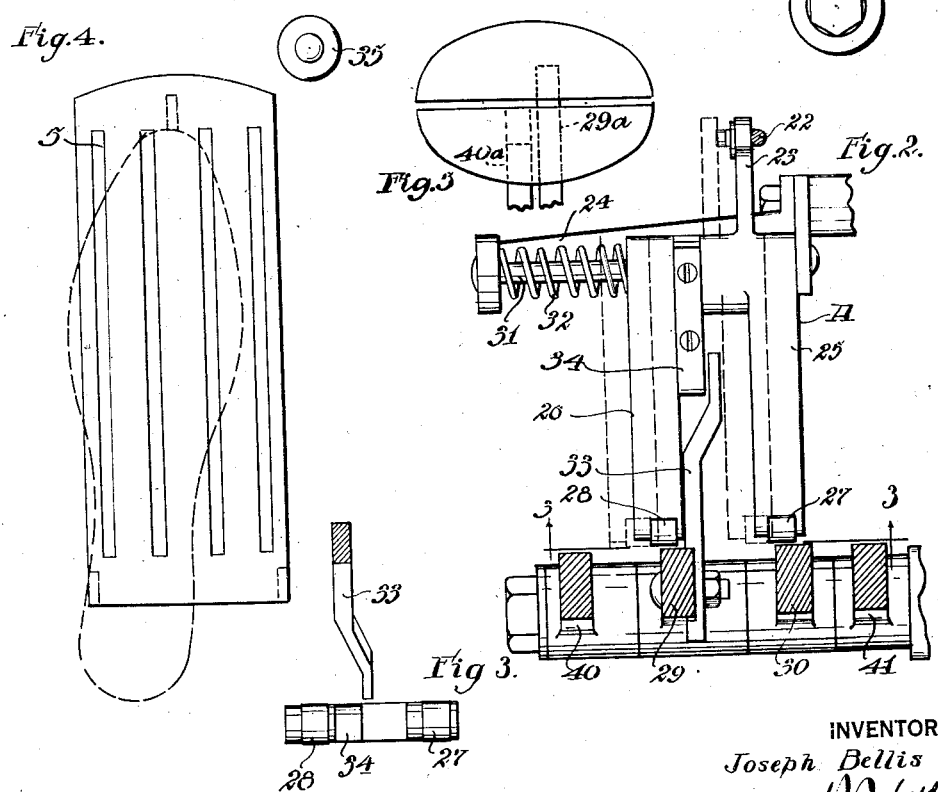
INVENTOR
Joseph Bellis
BY
ATTORNEY Patented Feb. 14, 1933

1,897,358

UNITED STATES PATENT OFFICE

JOSEPH BELLIS, OF ST. PAUL, MINNESOTA

CARBURETOR CONTROL MECHANISM

Application filed October 6, 1930. Serial No. 486,610.

The present invention relates to a carburetor control mechanism for use with motor propelled vehicles.

The customary method of carburetor control in motor propelled vehicles is by means of a foot operated pedal commonly referred to as the accelerator and throttle adjustment located either on the steering wheel or the instrument panel of the automobile. Various instrumentalities have been devised in an attempt to improve upon the common practice of carburetor control. Such instrumentalities especially when associated with the foot pedals of a car, such as the brake and clutch pedal, have either been mounted directly upon the foot pedal or have been operated by a movement of the foot pedal itself and with such an installation the driver is encouraged to drive with his foot resting upon the brake or clutch pedal with the result that the clutch face or brake lining is apt to be worn prematurely by such practice.

An object of the present invention is to make an improved carburetor control mechanism for motor propelled vehicles.

In order to attain this object, there is provided, in accordance with one feature of the invention, a hand throttle mechanism by means of which the carburetor control valve may be set at a required position, and a pair of freely pivoted foot control pedals, one positioned adjacent each of the clutch and brake pedals of the automobile. These freely pivoted pedals extend upwardly above the clutch and brake pedals, respectively, and are associated with a mechanism having operative connection with the carburetor control valve to close the carburetor control valve when said pedals are depressed a distance sufficient to bring the foot of the operator into contact with the clutch or brake pedal of the automobile, respectively.

A cam mechanism is provided to move said carburetor control mechanism to an inoperative position with respect to the brake pedal when the clutch pedal is depressed to permit acceleration of the motor by raising the foot from the control pedal associated with the clutch pedal, while the brake pedal is still depressed.

These and other features of the invention will be more fully brought out in the following description and the accompanying drawing, wherein:

Figure 1 is a view in side elevation of a mechanism embodying the present invention, showing the floor board of an automobile in section, and showing a portion of the intake pipe of a carburetor broken away to disclose a carburetor control valve mounted therein.

Figure 2 is a sectional view on the line 2—2 of Figure 1.

Figure 3 is a sectional view on the line 3—3 of Figure 2.

Figure 4 is a view in top elevation of a foot accelerator pedal and starter button, showing a preferred form of arranging these members; and Figure 5 is a view in top elevation of a car control pedal and a throttle control pedal showing the relative position thereof.

Referring to the drawing in detail, a floor board 1 and dash plate 2 are shown in section in Figure 1 and the intake pipe 10 of a conventional type of carburetor is shown broken away to disclose a carburetor control valve 3 mounted therein. A lever 14 is fixedly secured to the carburetor valve 3 and is operated by means of a link 4, a bell crank lever 7, and a rod 6 by means of a foot plate 5 which is hingedly mounted on the floor board 1 of the automobile. A spring 11 is connected to a member 12 which is secured to the link 4 to normally hold the carburetor control valve 3 in a closed position. A lever 13 is freely pivoted on the same pivotal support to which the lever 14 is fixedly connected, said lever 13 having an upwardly extending projection 15 to engage the lever 14 and move said lever 14 with the lever 13 when said lever 13 is rotated in a clockwise direction, the lever 14 still being free, however, for further movement in a clockwise direction beyond the limit of movement of the lever 13, as it will move away from the stop 15. The stop 15 will, however, prevent counter-clockwise rotation of the lever 14 beyond the stop 15. The outer end of the lever 13 is connected to a link 16 which is connected through an expansible joint to the hand throttle. The expansible joint, as illustrated, comprises a flanged collar 16a on the upper end of the rod 16, which is resiliently held against a threaded head 17a secured to the hand throttle rod 17. A sleeve 36 is threadedly secured on the head 17a, the lower end of said sleeve being flanged inwardly to support a spring 37, which is held in compression between this inturned flange and the collar 16a to normally hold this collar against the head 17a of the rod 17. In all normal operation of the hand throttle, these parts remain in the positions illustrated. However, when closing the throttle by means of the freely pivoted foot pedals 29 and 30 and associated mechanism, the rod 16 is drawn downwardly away from the rod 17, thereby compressing the spring 37. Upon release of the pedals, the spring 37 restores the parts to the position illustrated.

The pedal actuated member A is pivotally mounted on a rod 31 and is also slidable longitudinally of said rod 31, which is considerably longer than the width of the member A. A coil spring 32 encircling the rod 31 is held in compression between the outer end of the bracket 24 and a side of the member A to normally hold the member A in the extreme right hand position indicated in solid lines in Figure 2. The member A has a pair of lever arms 25 and 26 extending outwardly therefrom opposite to the direction of the lever arm 23, the lever arm 25 and 26 being provided with cam rollers 27 and 28, respectively, in the outer ends thereof. A pair of foot pedals 29 and 30 are mounted to rotate freely on a shaft which also supports a clutch pedal 40 and a brake pedal 41. These clutch and brake pedals may be of any suitable type of construction, such as is well known to the art. A cam arm 33 is secured to the pedal 29 and is adapted to engage a cam 34 mounted interiorly of the arm 26 of the member A upon depressing the pedal 29 to slidably move the entire member A to the left to the dotted line position shown in Figure 2. When thus moved to the left, the pedal 30 is out of alinement with the arm 25, the cam member 33 being constructed to hold the member 34 in depressed position as long as the pedal 29 is depressed.

The throttle plate 5 is preferably made quite large and is also preferably positioned closely adjacent to the starter button 35 so as to facilitate opening the carburetor valve as desired while pressing on the starter button. The upper end of the pedal 29 is curved over to lie closely adjacent the clutch pedal 40 and is curved upwardly to lie closely parallel to said clutch pedal. The curved upper portion 29a of the pedal 29 extends upwardly through the floor board of the car, as indicated at 42, being preferably longer than the similar curved portion 40a of the clutch pedal, so as to permit depressing the gas control pedal 29 a sufficient distance to throttle the motor before the foot of the operator engages the clutch pedal 40. The brake pedal 41 and its associated pedal 30 are also arranged in a similar manner.

In operating the device, assuming that the car is in operation and it is desired to set the hand throttle for a speed of thirty-five miles an hour, the hand throttle is adjusted to move the lever 13 to adjust the carburetor valve so that the speedometer reading is thirty-five miles an hour on a fairly level stretch of road. The entire gas control mechanism may then be disregarded until it is desired to either slow down or stop the car, or to further accelerate it to climb a hill, or on account of road conditions which may slow down the car. The car may be readily accelerated by means of the foot pedal 5 independently of the hand throttle and associated mechanism as the lever 14 is free to move in clockwise direction away from the stop 15. After such acceleration, upon releasing the foot from the accelerator pedal 5 the lever 14 will be drawn back by means of the spring 11 acting on the rod 4 until the lever 14 again engages the stop 15 and restores the carburetor control valve 3 to the set position determined by the setting of the hand throttle, namely, to a speed in the present hypothetical instance of approximately thirty-five miles an hour. In case it is desired to slow down the car a foot of the driver may be placed either on the pedal 29 adjacent the clutch pedal 40 or on the lever 30 adjacent the brake pedal 41. By slightly depressing either of these pedals the forward end of the member A will be moved downwardly, thereby raising the lever arm 23 and by means of the link 22 the lever arms 21 and 19, the link 18, and the lever arm 13, the carburetor control valve 3 will be moved to a closed condition. In the case of the clutch pedal 29, if this pedal is moved downwardly a sufficient distance to depress the clutch pedal 40 also, the cam 33 will engage the cam member 34 and move the entire member A slidably to the left so that the pedal 30 is out of alinement with the cam 25.

The extensible connection comprising the enlarged ends 16a and 17a of the rods 16 and 17, respectively, the sleeve 36 and the spring 37, between the hand throttle and the lever 13, will be extended against the tension of the spring 37 leaving the hand throttle adjustment undisturbed. By further depressing either foot, the clutch pedal 40 or the brake pedal 41 may be depressed to release the clutch or apply the brakes, as required.

Assuming that the car is stopped by depressing both the clutch and brake pedals, both of the gas control pedals 29 and 30 will, of course, be depressed also. Ordinarily, in starting again, the brake is first released and then the clutch is engaged. The arms 25 and 26 are moved to the dotted line position shown in Figure 2 by the depressing of the clutch and upon re-engaging the clutch the member A is released by the raising of the cam member 33 from engagement with the cam member 34. When thus released by the clutch, the member A will return to normal position before the clutch engages, as the clearance between the member 33 and the member 34 is much greater than the clearance between the cam roller and the levers 29 and 30 when in a normal position. Thus, the throttle will be opened just prior to the engagement of the clutch so that the acceleration of the motor will precede the engagement of the clutch in case the car is stopped on a hill and it is desirable to hold the brakes on until the clutch has been engaged. This is possible after the depression of the clutch pedal, since the member 25 is moved out of alinement with the pedal 30 which is adjacent the brake pedal. Thus, if the car is stopped on a hill and it is desired to start again, both the brake and clutch pedals are held depressed and the clutch pedal is gradually released until the motor accelerates until just prior to the engagement of the clutch, as above described, and, at the moment of engagement of the clutch, the brake may be released.

This device comprises a simple and positive mechanism for operating the carburetor control mechanism simultaneously with the operation of the brake and clutch pedals, without, however, requiring a direct connection between these pedals and the carburetor control mechanism.

I claim:

1. In a carburetor control mechanism for an automobile having a clutch pedal and a brake pedal, an adjustable hand throttle, a pair of foot pedals mounted one adjacent each of the clutch and brake pedals of an automobile and separate therefrom, the upper end of said pedals being higher than the corresponding parts of the clutch and brake pedals, respectively, and carburetor control means mounted to be engaged by said separate pedals upon a depression of either thereof to close the throttle prior to the upper end of said pedals coming into alinement with the upper end of said brake and clutch pedals, respectively.

2. In a carburetor control mechanism for an automobile having clutch and brake control pedals, an adjustable hand throttle, a separate pedal mounted adjacent a control pedal of said automobile, the upper end of said separate pedal being higher than the corresponding part of said automobile control pedal, and carburetor control means mounted to be engaged by said separate pedal upon a depression thereof to close the throttle prior to the upper end of said separate pedal coming into alinement with the upper end of said automobile control pedal.

3. In a carburetor control mechanism for an automobile having clutch and brake control pedals, an adjustable hand throttle, a carburetor control valve operatively connected thereto, a separate pedal mounted adjacent said automobile control pedal, the upper end of said separate pedal extending above said automobile control pedal, and means actuated by a depression of said separate pedal to close the carburetor control valve.

4. A carburetor control mechanism for an automobile having clutch and brake pedals, comprising a control valve, an adjustable hand throttle operatively connected thereto, a pair of separate pedals mounted one adjacent each of the clutch and brake pedals of an automobile, carburetor control means operatively associated with each of said separate pedals to close the throttle on a depression of either of said pedals, and means associated with the separate pedal adjacent said clutch pedal, to remove said control mechanism from operative association with said separate pedal adjacent said brake pedal on a predetermined depression of the pedal associated with said clutch pedal.

5. A carburetor control mechanism for an automobile having clutch and brake control pedals, comprising an adjustable hand throttle, a pair of pedals mounted one adjacent each of said clutch and brake pedals, carburetor control means operatively associated with said pair of pedals to close the throttle on a depression of either of said pedals, said carburetor control means being slidably mounted on a pivotal support, cam means carried by one of said pedals and cooperative cam means mounted on said carburetor control means to slidably move said carburetor control means to an inoperative position with respect to one of said pedals upon a depression of the pedal connected to said cam means.

6. A carburetor control mechanism of the character described for an automobile having a foot control pedal, comprising an adjustable hand throttle, a resilient extensible element mounted between said hand throttle and a carburetor control valve, said control valve having no operative connection with said pedal, carburetor control means mounted adjacent an automobile control pedal to be actuated upon the depression of said automobile control pedal to close said carburetor valve, the closing of said carburetor valve compressing said resilient element without disturbing said hand throttle from an adjusted position.

7. In a carburetor control mechanism for an automobile having a control pedal, an adjustable hand throttle, a carburetor control valve operatively connected thereto, a separate pedal mounted adjacent said automobile control pedal, means actuated by a depression of said separate pedal to close the carburetor control valve, and means actuated on a depression of said separate pedal to relatively advance said carburetor control valve with respect to said separate pedal.

8. In a carburetor control mechanism for an automobile, having a control pedal, an adjustable hand throttle, a carburetor control valve operatively connected thereto, a separate pedal mounted adjacent said automobile control pedal, an intermediate member pivotally and laterally slidably mounted adjacent said separate pedal, and positioned to be actuated by said separate pedal on a depression thereof, means operatively connecting said intermediate member to said carburetor control valve to close said carburetor control valve upon an actuation of said intermediate member by said separate pedal, and means acting on said intermediate member to slidably move said intermediate member upon a depression of said separate pedal to relatively advance said carburetor control valve with respect to said separate pedal.

In testimony whereof I affix my signature.

JOSEPH BELLIS.